April 10, 1962 J. M. KINKELLA 3,028,794
WIDE ANGLE MIRROR
Filed May 14, 1959 2 Sheets-Sheet 1

*INVENTOR.*
JOSEPH M. KINKELLA
BY
*Richard F. Carr*
ATTORNEY 3,028,794
WIDE ANGLE MIRROR
Joseph M. Kinkella, 363 18th St., Santa Monica, Calif.
Filed May 14, 1959, Ser. No. 813,102
5 Claims. (Cl. 88—87)

This invention pertains to a mirror, and more particularly to a mirror adapted for automobiles to provide a complete field of vision to the rear.

The hazardous blind spots for an automobile driver existing to the left rear and right rear have long been recognized. The conventional interior rear view mirror affords no visibility in those areas. In an effort to correct this, side mirrors mounted exteriorly of the car have been resorted to frequently. With present day automobiles having wide, wrap-around windshields, in particular, these side mirrors have not been satisfactory. It has become necessary to mount these mirrors in a position well forward of the driver in order to avoid interference to vision from the windshield post. This has meant that it is impossible to reach the mirror from the driver's seat so that adjustment becomes quite difficult and almost impossible for a person to accomplish alone. Also, this location for the side mirrors has meant that the mirror is located so far from the driver that the size of the image is reduced and it is more difficult for the driver to determine accurately the conditions to the rear. Over and above these difficulties, which are occasioned by the design of newer model cars, the side mirror possesses the inherent shortcoming of giving vision on only one side of the car. It also necessitates looking in widely spaced locations for using the side mirror in conjunction with the conventional interior rear view mirror. Furthermore, the side mirrors require complicated exterior mounting arrangements and result in protuberances from the car.

Efforts have been made in the past to provide a wide angle rear view mirror which could be installed inside an automobile. Some of these have been simply extra wide conventional mirrors which blocked too much of the windshield and did not effectively cover the area to the rear. Others have been curved mirrors, also failing to give complete vision and additionally distorting the image reflected. The device of this invention corrects these deficiencies by providing an assembly of three plane mirrors on a single universal mounting. One of these mirrors is the larger and for vision directly to the rear. A second mirror is positioned above the left portion of the first mirror and angled downwardly to the left, giving vision to that side of the car. A third mirror, slightly larger than the second, is positioned above the right portion of the first mirror and angled downwardly to the right. This covers the area on the right-hand side of the car.

Therefore, it is an object of this invention to provide a mirror device giving complete coverage of the entire field of vision to the rear of an automobile.

Another object of this invention is to provide a distortion-free wide-angle rear view mirror arrangement located entirely inside the car.

A further object of this invention is to provide an automotive mirror arrangement which is readily adjustable.

An additional object of this invention is to provide a rear view mirror arrangement giving complete vision to the rear, yet requiring attention to only one area.

These and other objects will become apparent from the following detailed description taken in connection with the accompanying drawing in which.

Figure 1:
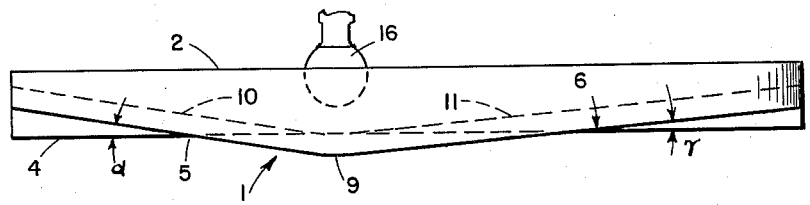
FIG. 1 is a top plan view of the mirror device of this invention.
Figure 2:
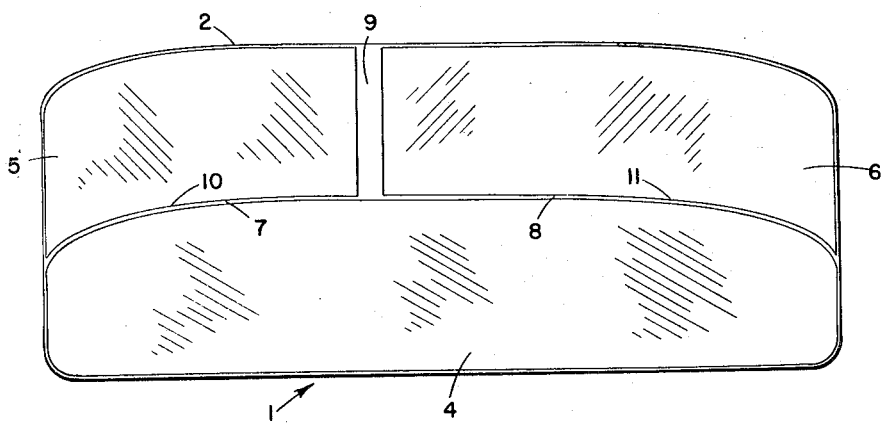
FIG. 2 is a front elevational view of the arrangement of FIG. 1.

With reference to the drawing, the mirror device 1 of this invention includes a frame 2 which mounts three mirrors, 4, 5, an d 6. Each of these mirrors is a distortion-free plane mirror. Mirror 4 is the larger of the three and located across the width of the bottom portion of the unit. This mirror is for giving direct rearward vision. The other two mirrors are for side vision and their combined lengths are substantially equal to the length of mirror 6.

Mirror 5, smaller than mirror 4, is disposed above the left portion of that mirror and separated from it by a narrow opaque frame portion 7. The reflective surface of mirror 5 is not in the same plane as that of mirror 4, but is inclined downwardly and to the left with respect thereto. In the preferred embodiment, angle $\alpha$, the leftward inclination of mirror 5, is approximately six degrees. The downward tilt $\beta$ is about three degrees. The reason for this angular relationship will be made more clear hereinafter.

Mirror 6, which is above the right-hand portion of mirror 4, includes downwardly and to the right with respect to mirror 4. Angle $\alpha$ to the right for mirror 6 is eight degrees, while the downward tilt angle $\delta$ is substantially three degrees.

While minor variations in these angles are possible, optimum results are obtained with the values given.

Figures 3, 5, 6:
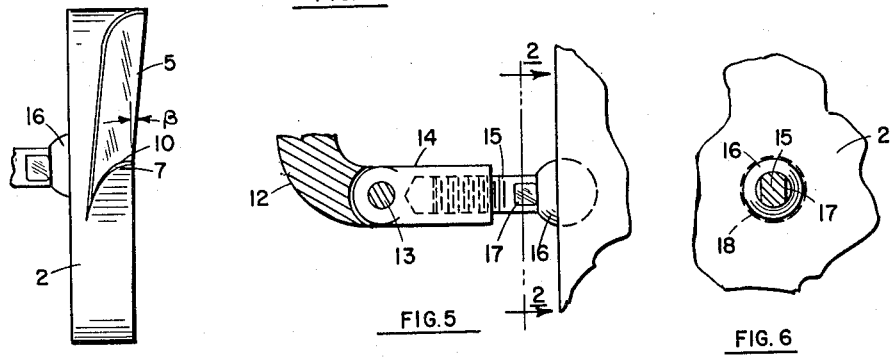
FIG. 3 is a left side elevational view of the arrangement of FIG. 2.
FIG. 5 is an enlarged fragmentary view partially in section illustrating the mounting arrangement for the mirror.
FIG. 6 is a sectional view taken along line 6—6 of FIG. 5.
Figure 4:
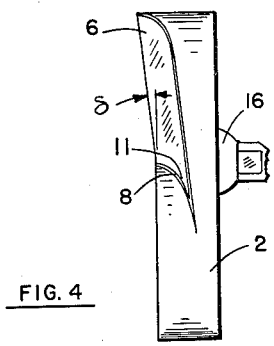
FIG. 4 is a right side elevational view of the arrangement of FIG. 2.

The upper mirrors are arranged so that their reflective surfaces fall generally behind that of lower mirror 4. As seen in FIGS. 3 and 4, lower edges 10 and 11 of mirrors 5 and 6 incline rearwardly from a forward point adjacent the surface of mirror 4. This means that mirrors 5 and 6 do not overhang mirror 4 except very slightly at their forward portions. Mirror 6, which is larger than mirror 5, is separated from the lower mirror 4 by a narrow opaque strip of frame 8. A larger opaque segment 9 of the frame separates the side edges of mirrors 5 and 6.

The mirror unit 1 is suitably mounted to adjacent structure such as the frame of the windshield or to the dashboard of the car so as to provide for universal movement and adjustment. Thus, for example, as shown in FIGS. 5 and 6 a bracket 12 inclines downwardly from the upper portion of the windshield, pivotally mounting on pin 13 one end of socket member 14. The latter threadably receives pin 15, the outer end of which includes a ball 16 engaging a complementary socket in the frame of the mirror. Flat areas 17 and 18 on pin 15 permit its rotation by a wrench so that this member is conveniently tightened in socket 14. In this manner, the mirror may be vertically positioned by pivotable movement about pin 13 while rotation about ball 16 provides universal movement for the device.

Figure 7:
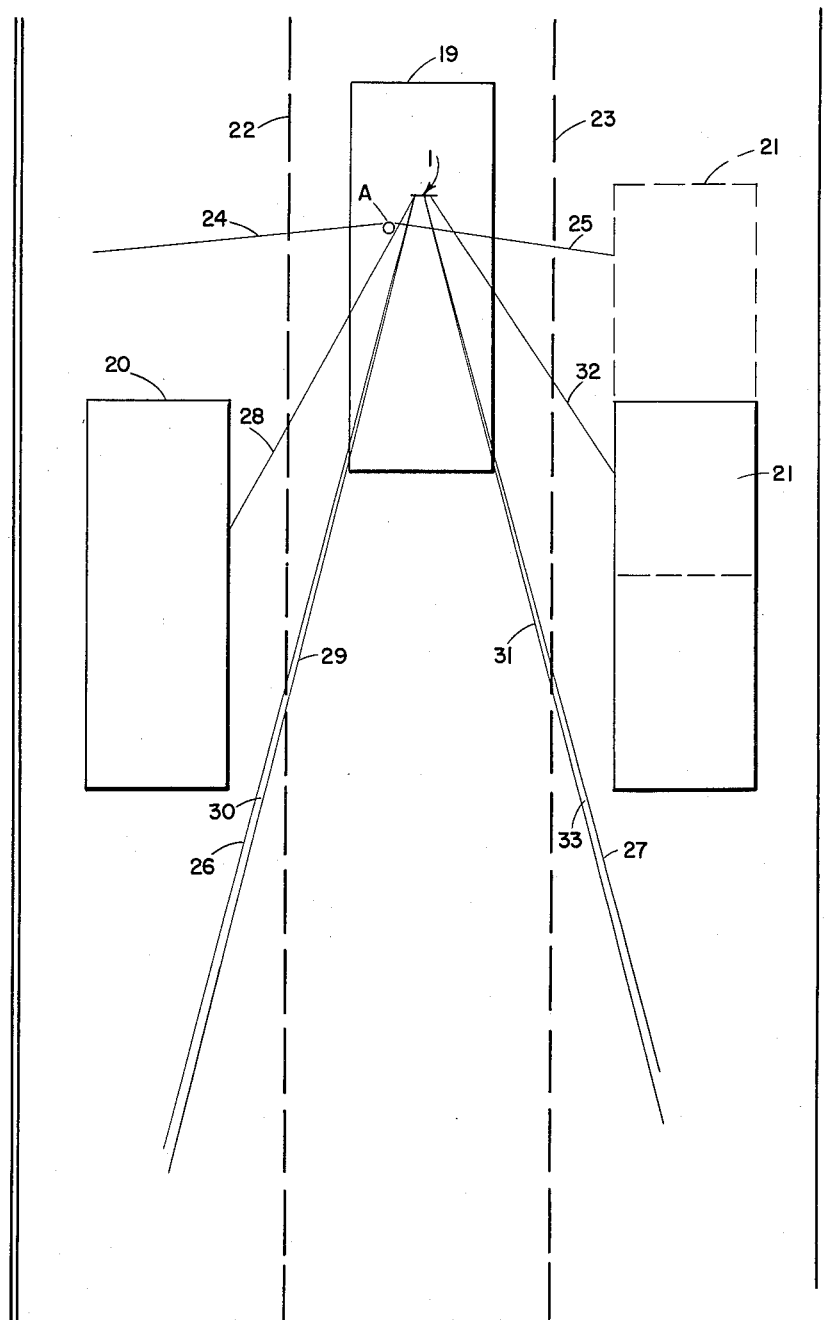
FIG. 7 is a schematic view illustrating the field of vision obtained with the mirror of this invention.

The use of the invention may be understood by reference to the schematic illustration of FIG. 7 where rectangles 19, 20, and 21 represent standard length automobiles traveling in lanes defined by painted lines 22 and 23 such as will be found on usual city streets. These cars will be spaced laterally about five feet apart in a typical situation. The driver of car 19 with his eyes at point A will have full forward vision limited peripherally along lines 24 and 25. Vision directly to the rear aftorded by the larger mirror 4 is indicated by diverging lines 26 and 27.

Normally, the entire areas between the latter two lines and the limits of the driver's peripheral vision would be blind spots to the driver of automobile 19. In other words, there would be no visibility between line 26 and 24, or between line 27 and line 25. Automobiles 20 and 21 could not be seen.

However, mirror 5 by being inclined to the left allows the driver to see objects on his left within the boundaries formed by lines 28 and 29. This means that through mirror 5 automobile 20 is visible to the driver of automobile 19 by his observation of mirror unit 1. It may be noted that there is an overlapping portion 30 of the field of vision of mirror 5 and the field of mirror 4. This means that as a car approaches from the rear to overtake car 19, visual contact will not be lost as the vehicle moves out of the field of mirror 4 and into that of mirror 5. Very little obstruction to this vision comes from the narrow supporting posts at the rear window of present day automobiles. The slight downward tilt of mirror 5 allows the driver to see smaller cars in the lane to the left and improves his observation of larger automobiles.

Vision to the right of the driver comes about through mirror 6, which gives a field of view in the right lane as defined by lines 31 and 32. Here also the field of mirror 6 and that of mirror 4 overlap at portion 33 so that an approaching vehicle is always in sight. The downward tilt of mirror 6 allows the driver to observe smaller cars to his right and gives optimum visibility of larger cars. Because of the location of the driver's seat at the left-hand side of the car, right mirror 6 is made larger than mirror 5 so that comparable fields of vision for the driver will be obtained by these two mirrors.

Even as a car to right or the left of the driver passes the driver's automobile, it always is kept in sight. For example, if automobile 21 moves forwardly relative to car 19 to the position shown in phantom, the front end of car 21 enters the peripheral field of vision of the driver of car 19 before the rear portion of the car passes from the field of vision of mirror 6 bounded by line 32. A similar effect obtains to the driver's left by the field of mirror 5. Thus, the mirror device of this invention assures complete safety by enabling a driver to observe a car on either side throughout any kind of relative movement to the rear of the driver.

The opaque frame portions 7, 8, and 9 which separate the three mirrors assist the driver in differentiating among the images in the individual mirrors. A wider section 9 is interposed between mirrors 5 and 6 because without it more possibility of confusion exists between those two mirrors. With the boundaries as provided, however, the driver has no problem in recognizing the precise position of an object reflected by the mirror unit.

It has been found to give best results if the larger mirror for direct rear vision is located at the bottom of the unit with the two side view mirrors disposed above, as illustrated. Accurate vision also is enhanced when the side view mirrors are generally to the rear of the plane of mirror 6 as described above, rather than overhanging the top edge of the lower mirror.

The mirror unit may be made very compact requiring scarcely more room than a conventional rear view mirror. This means that the device is neither unsightly nor does it needlessly block out portions of the windshield.

It may be seen, therefore, that by this invention complete rear vision is afforded by a single unit having but one universal mounting joint. The driver is required to observe only one area in order to detect exact conditions to the rear of his car. The device is made up of distortion-free plane mirrors, close enough to the driver, and adjusted as a unit so that a clear accurate image always may be obtained.

The foregoing detailed description is to be clearly understood is given by way of illustration and example only, the spirit and scope of this invention being limited solely by the appended claims.

I claim:

1. A mirror device comprising a frame means, universal mounting means for adjustably securing said frame means to adjacent structure, a first elongated plane mirror disposed across the bottom portion of said frame means, a second plane mirror on said frame means disposed above the left portion of said first plane mirror with its bottom edge behind said first mirror, said second plane mirror being inclined slightly downwardly and to the left with respect to said first mirror, a third mirror on said frame means disposed above the right portion of said first plane mirror with its bottom edge behind said first mirror, said third plane mirror being inclined slightly downwardly and to the right with respect to said first mirror, said frame including relatively narrow non-reflective portions interposed between and extending the length of adjacent edges of said mirrors.

2. A device as recited in claim 1 in which said non-reflective portion of said frame between said second and third mirrors is wider than said non-reflective portions between said first mirror and said second mirror and between said first mirror and said third mirror.

3. A device as ecited in claim 1 in which said third mirror is longer than second mirror.

4. A mirror device comprising a frame, and three mirrors rigidly secured to said frame, the first of said mirrors having an elongated reflective surface longitudinally disposed at the lower portion of said frame, the second and third mirrors being disposed directly above said first mirror, the combined length of said second and third mirrors being substantially the length of said first mirror, said second mirror being disposed at the left portion of said frame with its reflective surface inclining downwardly and to the left of said reflective surface of said first mirror, said third mirror being disposed at the right portion of said frame with its reflective surface inclined downwardly and to the right of said reflective surface of said first mirror, said frame having relatively narrow elongated nonreflective portions interposed between adjacent edges of said mirrors.

5. A device as recited in claim 4 in which said second mirror is inclined to the left at an angle of approximately six degrees and downwardly at an angle of approximately three degrees with respect to the reflective surface of said first mirror, and said third mirror is inclined to the left at an angle of approximately eight degrees and downwardly at an angle of approximately three degrees with respect to said reflective surface of said first mirror.

References Cited in the file of this patent

UNITED STATES PATENTS

| D. 65,014 | Rivard | June 24, 1924 |
| D. 74,625 | Rivard | Mar. 6, 1928 |
| 35,344 | Willard | May 20, 1862 |
| 1,554,238 | Smith | Sept. 22, 1925 |
| 1,925,666 | Kerns | Sept. 5, 1933 |
| 2,279,751 | Hensley | Apr. 14, 1942 |
| 2,493,546 | Orser | Jan. 3, 1950 |
| 2,890,539 | Holt | June 16, 1959 |